Oct. 11, 1938.　　　D. DENELSBECK　　　2,132,868
METHOD AND APPARATUS FOR DECORATING ARTICLES
Original Filed Nov. 17, 1933　　4 Sheets-Sheet 1
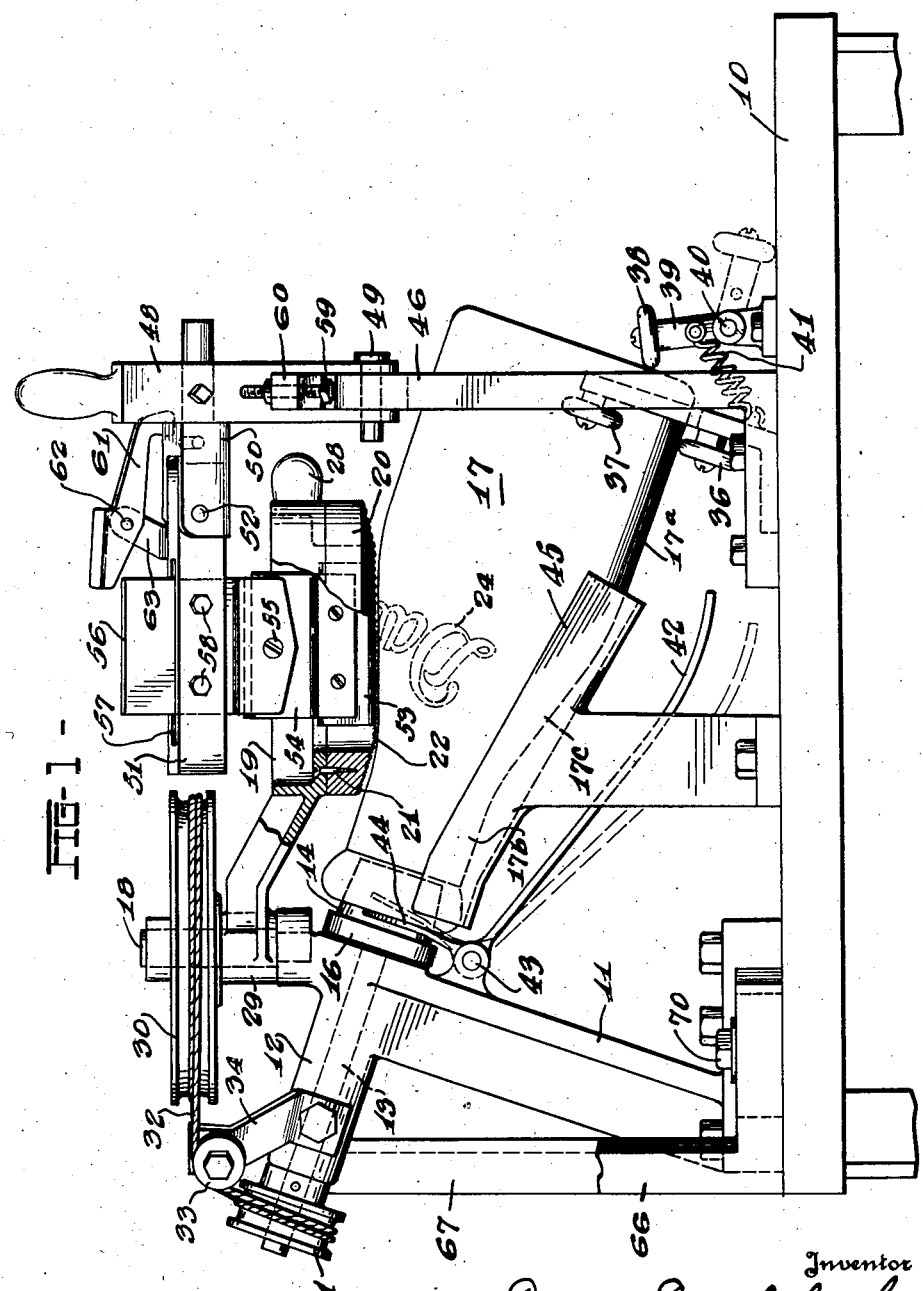

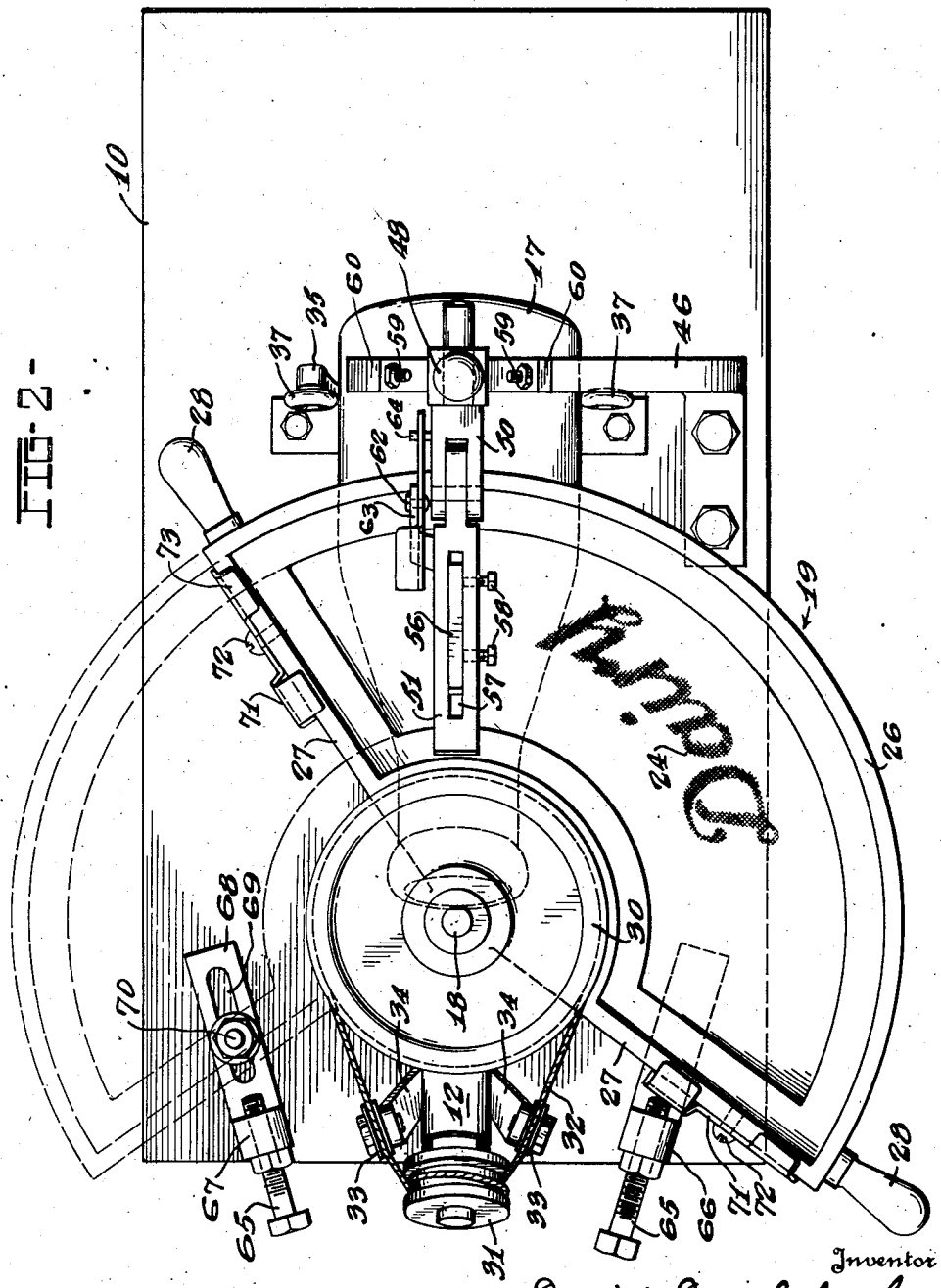

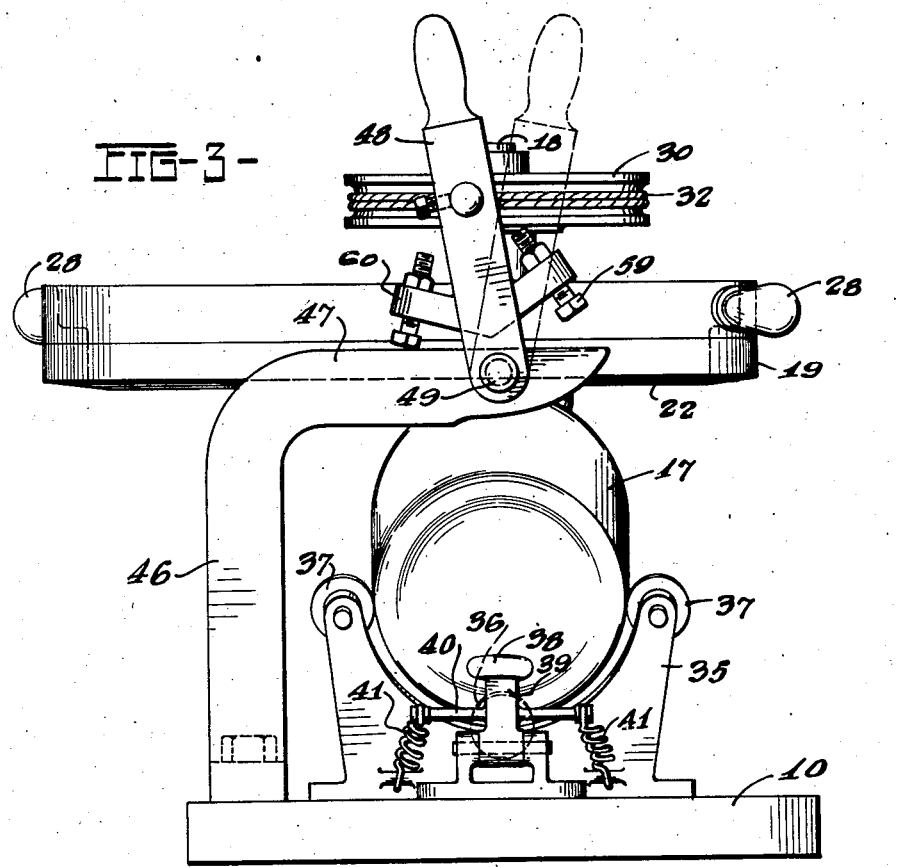
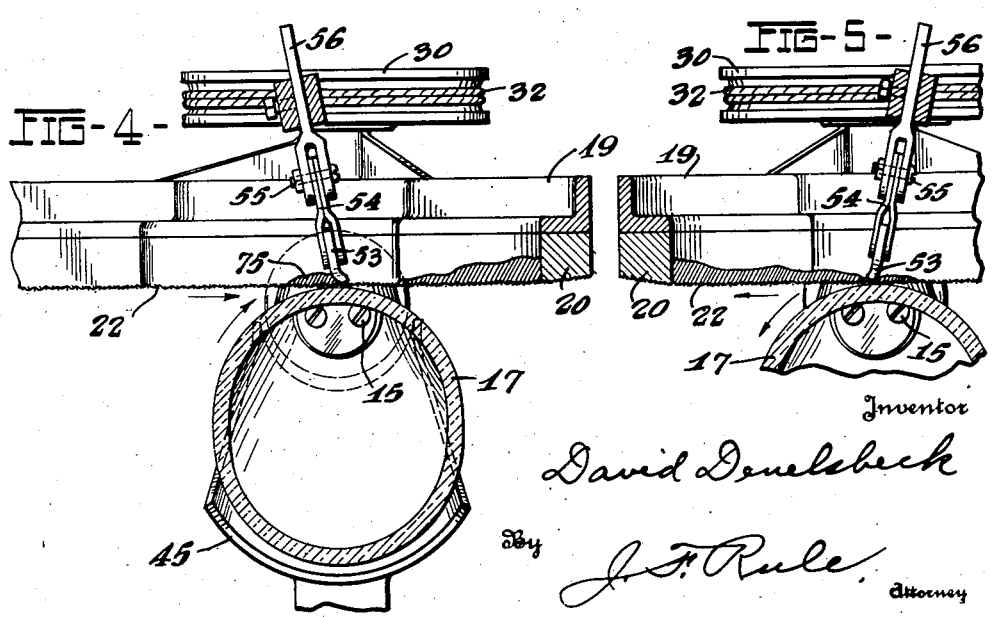

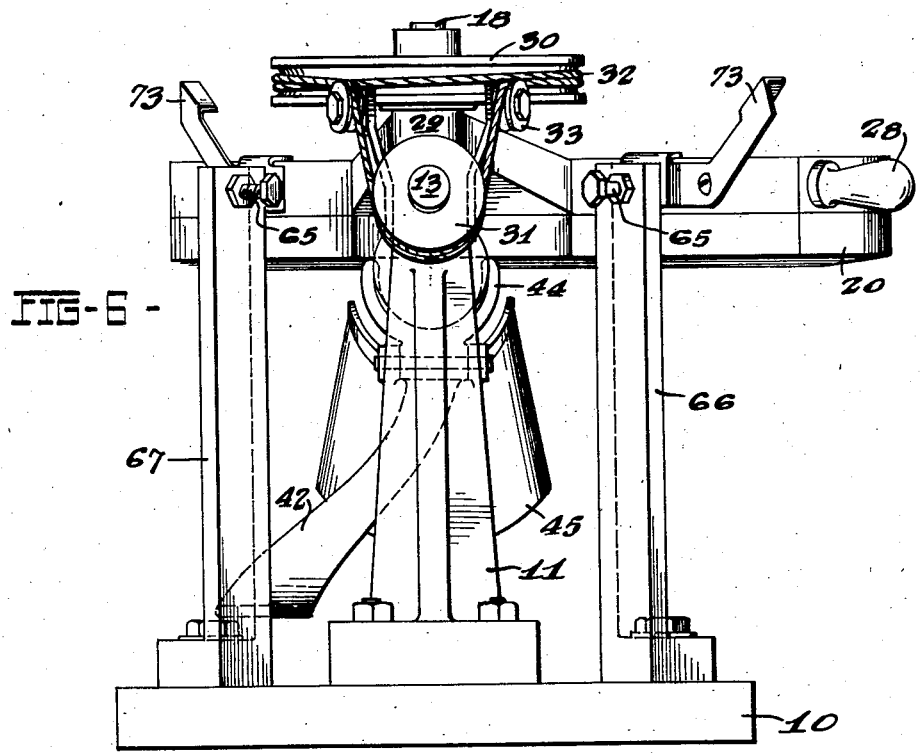
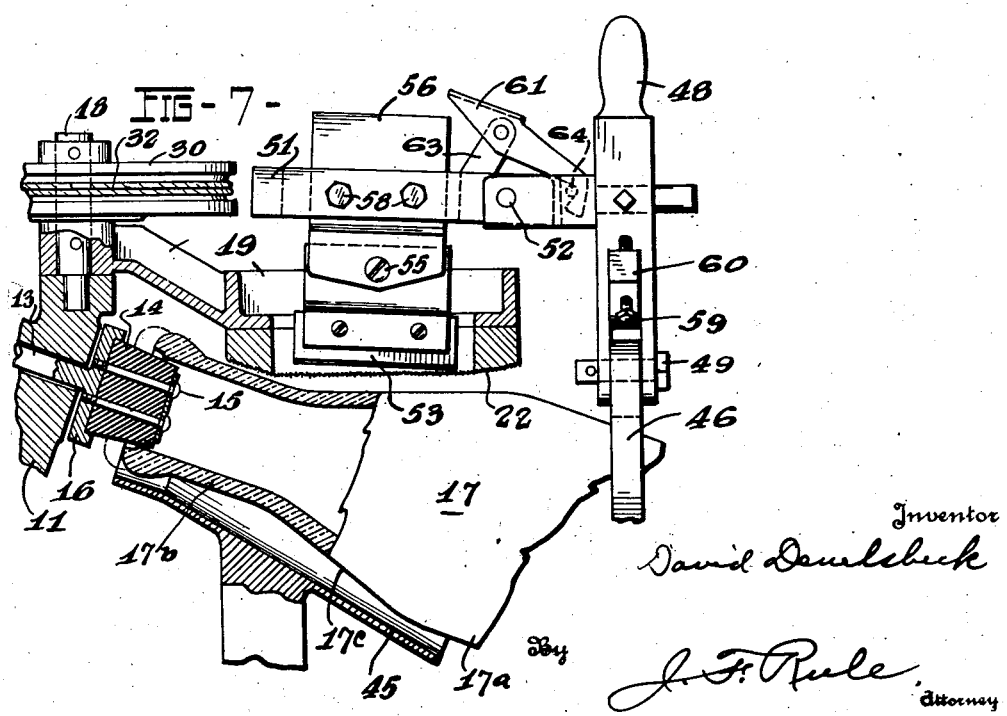

Patented Oct. 11, 1938

2,132,868

UNITED STATES PATENT OFFICE 2,132,868

METHOD AND APPARATUS FOR DECORATING ARTICLES

David Denelsbeck, Huntington, W. Va., assignor to Owens-Illinois Glass Company, a corporation of Ohio Application November 17, 1933, Serial No. 698,396
Renewed March 17, 1938

22 Claims. (Cl. 101—124)

My invention relates to a method and apparatus for marking, lettering or decorating the surfaces of various articles, and in its preferred form relates particularly to a stenciling method of surface marking or ornamentation. An object of the invention is to provide a method and apparatus of the character indicated for surface ornamentation or marking of conical, frusto-conical or similar surfaces. The invention is herein shown as adapted for use in decorating the tapered or shoulder portions of round bottles, such as milk bottles, although the invention is not limited to such use but may be employed in the decorating of various other articles.

Other objects of the invention will appear hereinafter.

Referring to the accompanying drawings:

Fig. 1 is a side elevation of a machine embodying the principles of my invention, parts being broken away to more clearly show the construction.

Fig. 2 is a plan view of the machine.

Fig. 3 is a front elevation of the machine.

Fig. 4 is a fragmentary sectional elevation.

Fig. 5 is a similar view with the parts in a different position.

Fig. 6 is a rear elevation of the machine.

Fig. 7 is a fragmentary sectional side elevation.

Referring to the drawings, the machine is herein shown as designed and adapted for decorating the shoulder portions of bottles. The machine is mounted on a platform or table 10. A standard 11 bolted to the rear end of the table, rises therefrom in a forwardly inclined direction and at its upper end is formed with an inclined bearing extension or hub 12 in which is journaled a shaft 13 carrying at its forward end a chuck 14. The chuck 14 may comprise a block made of rubber or other suitable material removably connected as by means of screws 15 (Fig. 7) to a head or holder 16 on the shaft 13. The chuck 14 is adapted to enter the mouth of a bottle 17 for holding and rotating the bottle during the decorating operation, as hereinafter set forth.

Rotatably supported on the standard 11 above the chuck is a vertical spindle 18 to which is attached a stencil carrier in the form of a segmental frame 19, for horizontal oscillation about the axis of the spindle. Beneath the frame 19 is a screen frame 20 removably attached thereto as by means of screws 21. Attached to the lower surface of the frame 20 is a horizontally disposed fabric 22 which may be a silk screen of usual construction carrying a stencil or pattern of the design to be applied to the bottle 17. The stencil may comprise a sheet of impervious or non-porous material covering or secured to the face of the screen, said sheet having portions cut away to form the desired design 24. The frame 19 comprises inner and outer frame members 25 and 26, respectively, curved concentric to the shaft 18, and end members 27 substantially radial to said shaft. The screen frame 20 is correspondingly shaped.

The carrier 19 is provided with handles 28 for oscillating it between the positions shown in full lines and dotted lines, respectively (Fig. 2). The hub 29 of the frame 19 and a pulley 30 are both mounted on and keyed to the spindle 18, so that they oscillate as a unit. A pulley 31 is keyed on the shaft 13 and is driven from the pulley 30 by means of a belt or cable 32 wound on the pulleys 30 and 31 and running over idlers 33 carried on brackets 34 attached to the hub 12.

The work piece 17, here shown as a milk bottle of usual form, comprises a cylindrical body portion 17ª, a neck portion 17ᵇ and an intermediate tapered shoulder portion which has a substantially frusto-conical surface 17ᶜ. When a bottle is placed in position in the machine, the lower end thereof is supported by a yoke 35 which carries a bottom roller 36 to engage the under surface of the bottle, and side rollers 37 which contact with the sides of the bottle. These rollers are so positioned that they hold the bottle in alignment with the shaft 13, that is, with the axis of the bottle coinciding with the axis of the shaft 13. An end roller 38 bears against the bottom of the bottle and holds it in engagement with the chuck 14. The roller 38 is carried at the upper end of a post 39 mounted to swing about a horizontal pivot 40 and held in either operative or inoperative position by coil springs 41 (Figs. 1 and 3). The bottle may be disengaged from the chuck by a releasing lever 42 pivoted at 43 to the standard 11 and comprising an arm 44 or yoke which extends upward into position to engage the lip of the bottle. The bottle is temporarily supported and guided into position on the chuck by a stationary inclined trough shaped support or guide 45.

The squeegee mechanism for forcing the paint or decorating material through the silk screen, is supported on a standard 46 bolted to the table 10. Said standard comprises a horizontally extending arm 47 on which a reversing lever 48 is mounted for oscillation about a pivot 49. The lever 48 carries a rearwardly extending arm comprising sections 50 and 51 connected by a pivot pin 52.

The squeegee comprises a blade or wiper 53 adapted to bear against the screen, said wiper being clamped in a holder 54 which is connected by a pivot pin 55 to a holding plate 56, the latter extending through a slot 57 in the arm 51 and adjustably held therein by set screws 58. The squeegee holder 54 is in an inclined position, as shown in Fig. 4, while in operation and when the screen reaches the end of its stroke the squeegee is swung to the oppositely inclined position (Fig. 5). This is effected by swinging the reversing lever 48 (Fig. 3) from the full line to the dotted line position. The throw of the lever is adjustably limited by stop bolts 59 adjustable in lugs 60 carried by said lever, said stop bolts being positioned to engage the arm 47. Before operating the lever 48 to reverse the inclination of the squeegee, the latter is swung upward about the pivot pin 52, and is temporarily held in its lifted position by a latch 61 pivoted at 62 to a bracket 63 on the arm 51, the latch being adapted to engage a pin 64 on the arm 50 for holding the squeegee away from the screen, as shown in Fig. 7.

Means for limiting the oscillating movements of the screen carrier 19 comprise stop bolts 65 adjustably mounted in the upper ends of standards 66 and 67. Each of said standards comprises a foot 68 with a slot 69 therein through which extends a clamping bolt 70 for clamping the standard to the platform 10. This slot and bolt connection permits additional adjustment of the stops 65. Mounted on each end of the frame 19 is a stop device 71 cooperating with the stop bolts 65. This device 71 consists of a lever arm connected to the frame by a pivot 72 and comprises an upwardly inclined finger piece or extension 73. The purpose of this construction is set forth hereinafter.

It will be noted that the work piece or bottle 17 when in position (Fig. 1) is so inclined that the upper side or uppermost line of the frusto-conical surface 17ᶜ extends substantially horizontally, said surface being tangent to the horizontal screen and forming a horizontal line of contact therewith, said line, moreover, being in the vertical plane of the axis of the bottle. Stated another way, the vertical plane in which lies the axis of the bottle, intersects the conical surface 17ᶜ in a straight horizontal line which coincides with the line of contact of the screen with said surface. It should be further noted that the axis of the vertical spindle 18 intersects the axis of the bottle and shaft 13. This point of intersection is located at, or substantially at, the apex of the cone, of which said surface 17ᶜ is a frustum. In other words, if the tapered surface 17 were extended forward to a point, said point would be at the intersection of the two axes represented by the shafts 13 and 18.

*Operation*

The operation may be described as follows: Assuming the screen carrying frame 19 to be in the position shown in full lines in Figs. 2 and 3 and the reversing lever 48 thrown to the left, as shown in Figs. 3 and 4, the bottle 17 is first placed in position. The guide 45 (Fig. 1) aids in guiding the neck end of the bottle onto the chuck 14. With the lower end of the bottle positioned and supported by the rolls 36 and 37, the end roll 38 is snapped upward from the dotted to the full line position (Fig. 1) for holding the bottle securely on the chuck. While the bottle is being placed in position, the squeegee is held up, away from the screen, by the latch 61 (Fig. 2). When the bottle is in place, the latch 61 is released and the squeegee permitted to drop. The screen 22 is now tangent to and in contact with the tapered surface 17ᶜ which is to be decorated and the squeegee 53 bears against the screen along its line of contact with said surface (Fig. 4). The operator now, by means of a handle 28, swings the carrier 19 horizontally about the axis of the spindle 18 to the dotted line position (Fig. 2), causing the screen to travel over the frusto-conical surface of the bottle which, during said movement, rotates about its own axis and rolls in contact with the screen.

The pulley 30 which rotates with the frame 19 drives the cord 32 and thereby imparts rotative movement to the chuck 14 for positively rotating the bottle 17. The parts are so designed and the pulleys 30 and 31 are so proportioned that the surface speed of rotation of the surface 17ᶜ at every point of contact with the screen, is equal to the speed of the screen at said point of contact therewith. During this movement, the squeegee 53 remains stationary, bearing with a yielding pressure against the screen which is sliding therebeneath so that the decorating material 75, for example, a semi-liquid paint, is forced through the stenciled screen in a well known manner to apply the design 24 to the tapered surface of the bottle.

The frame 19 is arrested at the end of its stroke by the stationary stop 65 contacting with the cooperating stop 71 on the frame. The squeegee is now lifted from the screen and held by the latch 61 (Fig. 7), and the bottle withdrawn. By depressing the lever 42 the bottle is forced endwise off the chuck. The endwise movement of the bottle serves to throw the roll 38 downward to the dotted line position. Another bottle is now placed in position to be decorated in like manner, during the return movement of the carrier 19 to the full line position (Fig. 1). But before this return movement, the squeegee is reversed by swinging the reversing lever to the dotted line position (Fig. 3) while the squeegee is still held up by the latch 61. Also, before releasing the latch 61, the stop 71 may be lifted out of engagement with the stop bolt 65 by depressing the finger piece 73 and the screen frame given an additional final movement, thereby carrying the squeegee or wiper 53 over the coloring material which has been piled up in front of it so that it will again be in advance of the wiper during the return movement of the frame 19.

Modifications may be resorted to within the spirit and scope of my invention.

I claim:

1. The method of decorating the surface of a cone which comprises causing rolling contact of said surface with a flat stencil screen by rotating said surface about its axis and simultaneously causing a movement of the screen relative to the cone about an axis intersecting the axis of the cone at its apex.

2. The method of stenciling a frusto-conical surface of a cone which comprises rotating said surface about its axis, moving a flat stencil screen while tangent to said surface, about an axis perpendicular to the screen and intersecting the said first mentioned axis at the apex of the cone with the screen in rolling contact with said surface, and applying a coating material through the screen to said surface as the latter advances in contact with the screen.

3. In apparatus for stenciling an article having a conical or frusto-conical surface, the combination of means for supporting the article and rotating it about the axis of said surface, a flat stencil screen, means to maintain said screen in tangential contact with said surface while the latter rotates, and means for causing a relative advance movement of said article and screen with the screen and said surface advancing at the same surface speed at all points along the line of contact.

4. A machine for decorating articles comprising, in combination, holding means for the article, means for rotating said article about an axis, a stencil device, and means for oscillating said stencil about an axis inclined to said first mentioned axis.

5. A machine for decorating the surface of an article comprising means for rotating the article about an axis, the part of said surface to which the decoration is applied having portions at different distances from said axis and thereby moving at different speeds during said rotation, a flat pattern, and means for causing said pattern to advance bodily in its own plane along said surface in rolling contact therewith during said rotation, with said surface and pattern advancing at the same speed at each point of contact.

6. A machine for decorating the surface of an article comprising means for holding the article, means for rotating it about an axis, a screen frame, a screen carried thereby, means for oscillating said frame about an axis with the screen in rolling contact with said surface, and means to apply decorating material through the screen to said surface.

7. A machine for decorating the surface of an article comprising means for holding the article, means for rotating it about an axis, a screen frame, a flat screen carried thereby, means for oscillating said frame about an axis with the screen moving in its own plane in rolling contact with said surface, and means to apply decorating material through the screen to said surface.

8. A machine for decorating the surface of an article comprising means for holding the article, means for rotating it about an axis, a screen frame, a flat screen carried thereby, means for oscillating said frame about an axis with the screen moving in its own plane in rolling contact with said surface, and means to apply decorating material through the screen to said surface, said last mentioned means including a squeegee or wiper held against the screen at the points of contact between the screen and said surface.

9. A decorating machine comprising means to hold an article, means for rotating it about an inclined axis, a screen frame, a screen carried thereby, and means for oscillating said frame about a vertical axis, with the screen in rolling contact with the said article.

10. A machine for decorating an article having a conical surface which comprises means for holding the article with the axis of said surface inclined, means for rotating the article about said axis, a horizontally disposed screen frame, a screen carried thereby above and tangent to said surface, and means for oscillating said screen in rolling contact with said surface during said rotation of the article.

11. A machine for decorating an article having a conical surface which comprises means for holding the article with the axis of said surface inclined, means for rotating the article about said axis, a horizontally disposed screen frame, a screen carried thereby above and tangent to said surface, means for oscillating said screen in rolling contact with said surface during said rotation of the article, and driving connections between the means for rotating the article and the means for oscillating the screen by which the screen is advanced at substantially the same surface speed as the said conical surface at all points of contact therewith.

12. A machine for decorating articles comprising a chuck for holding one end of the article, means for supporting the opposite end of the article, means for rotating the chuck and thereby rotating the article, a screen frame, means for oscillating said frame, and driving connections between said frame and said chuck.

13. A machine for decorating bottles comprising a holding device for engaging one end of the bottle and holding it in an inclined position, means for supporting the opposite end of the bottle, means for rotating said holding device about the inclined axis of the bottle and thereby imparting rotative movement to the bottle, a screen frame and screen positioned above the bottle, means for reciprocating said frame during the rotation of the bottle with the screen horizontal and in contact with a surface of the bottle to be decorated, and means for applying a decorating material through the screen to said surface.

14. The method of stenciling a substantially conical or frusto-conical surface which comprises advancing said surface along the flat face of a stencil having a line of contact therewith, by a combined rotative movement of the conical surface about its axis and a simultaneous movement of the stencil face in its own plane and with the speed of said movements equal at each point of contact between said surface and stencil face, and applying a decorating material to the conical surface as it rolls in contact with the stencil.

15. A machine for decorating the conical surface of an article, comprising means for holding the article, means for rotating it about the axis of said surface, a stencil screen tangent to and in contact with said surface, and means for imparting an angular movement to the screen in its plane of tangency during said rotation, whereby the article is caused to roll along the screen as it rotates, said movement of the screen and rotation of the article being coordinated to prevent slipping or sliding movement between said surface and screen.

16. A machine for decorating the conical surface of an article, comprising means for holding the article, means for rotating it about the axis of said surface, a stencil screen tangent to and in contact with said surface, means for imparting an angular movement to the screen in its plane of tangency during said rotation, whereby the article is caused to roll along the screen as it rotates, said movement of the screen and rotation of the article being coordinated to prevent slipping or sliding movement between said surface and screen, a squeegee, and means for holding said squeegee in contact with the screen and in a fixed position relative to the said axis of rotation during the said rolling movement of said surface.

17. The method of stenciling a conical or frusto-conical surface which comprises rotating said surface about its axis, maintaining a line of rolling contact between said surface and a stencil during said rotation, causing the stencil to advance relative to said surface in a plane tangent thereto with each point in said line advancing along the stencil at the speed of rotation of said surface at said point, and concomitantly applying a decorating or coating material through the stencil to said surface.

18. A machine for decorating an article having a frusto-conical surface, comprising means for holding the article, means for rotating it about the axis of said surface, means for holding a pattern lying in a plane, means for maintaining rolling contact of said surface with the pattern during said rotation, and means for imparting angular movement to the pattern as a whole relative to said axis and in the said plane of the pattern during said rotation, said relative movement being in a direction and at a speed to prevent sliding movement or slipping between said surface and pattern.

19. A machine for decorating the surface of an article comprising means for holding the article, means for rotating it about an axis, a screen frame, a flat screen carried thereby, means for oscillating said screen about an axis with the screen moving in its own plane in rolling contact with said surface, and means to apply decorating material through the screen to said surface.

20. The method of stenciling a conical or frusto-conical surface which comprises rotating said surface about its axis in rolling contact with a stencil, causing the stencil as a whole to advance relative to said surface and during said advancement causing each point of contact of the stencil with said surface to advance over said surface at a speed proportional to its distance from said axis and progressively applying a decorating or coating material through the stencil to said surface during said rotation.

21. The method of stenciling a conical or frusto-conical surface which comprises rotating said surface about its axis, maintaining a line of rolling contact between said surface and a stencil during said rotation, causing the stencil to advance relative to said surface with each point in said line advancing along the stencil at the speed of rotation of said surface at said point, and concomitantly applying a decorating or coating material through the stencil to said surface.

22. The method of stenciling a conical or frusto-conical surface which comprises rotating said surface about its axis, maintaining a line of rolling contact between said surface and a stencil during said rotation, causing relative movement betweeen the stencil and said surface with each point in said line of rolling contact changing at the speed of rotation of said surface at said point, and concomitantly applying a decorating or coating material through the stencil to said surface.

DAVID DENELSBECK.